United States Patent [19]

Bascou et al.

[11] 4,274,895
[45] Jun. 23, 1981

[54] METHOD OF MANUFACTURING A FLEXIBLE ELECTRIC CABLE WHICH HAS A TINNED STRANDED CONDUCTOR ON WHICH AN INSULATION IS APPLIED AT A HIGH TEMPERATURE

[75] Inventors: Edith Bascou, Draveil; Jean-Pierre Ferlier, Yerres, both of France

[73] Assignee: Filotex, Draveil, France

[21] Appl. No.: 115,852

[22] Filed: Jan. 28, 1980

[30] Foreign Application Priority Data

Dec. 18, 1979 [FR] France ................. 79 30995

[51] Int. Cl.³ ............................................. H01B 1/02
[52] U.S. Cl. .................................... 156/53; 427/120; 427/383.9; 428/646
[58] Field of Search ............... 156/53; 427/120, 383.9; 174/110 N, 113 R, 128 R; 428/626, 646; 204/37 T

[56] References Cited

U.S. PATENT DOCUMENTS 2,737,483  3/1956  Lowenheim ................. 204/37 T
4,014,660  3/1977  Schreiner et al. ............ 428/646

Primary Examiner—Ralph S. Kendall
Attorney, Agent, or Firm—Sughrue, Rothwell, Mion, Zinn and Macpeak

[57] ABSTRACT

The present invention relates to a method of manufacturing a flexible electric cable with a tinned stranded conductor on which insulation is applied at a high temperature. Previous diffusion of tin in the copper of the conductor strands makes it possible to prevent the strands from blocking together while the insulation is being formed at a temperature higher than the melting point of tin, while still leaving a final layer of pure tin at the surface of these conductor strands. Application to manufacture of aircraft cables.

7 Claims, 3 Drawing Figures

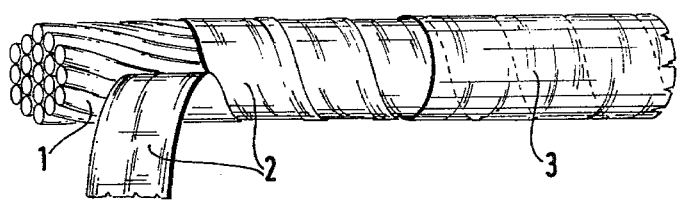
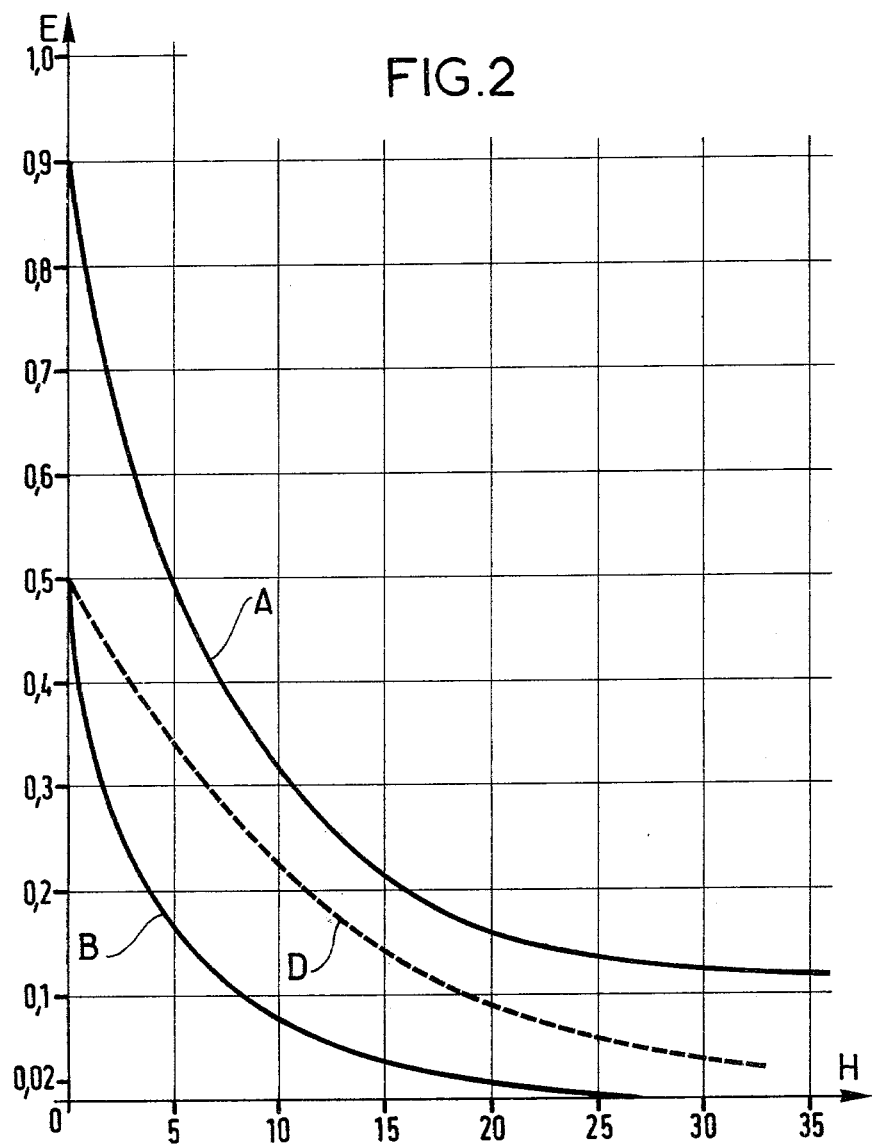

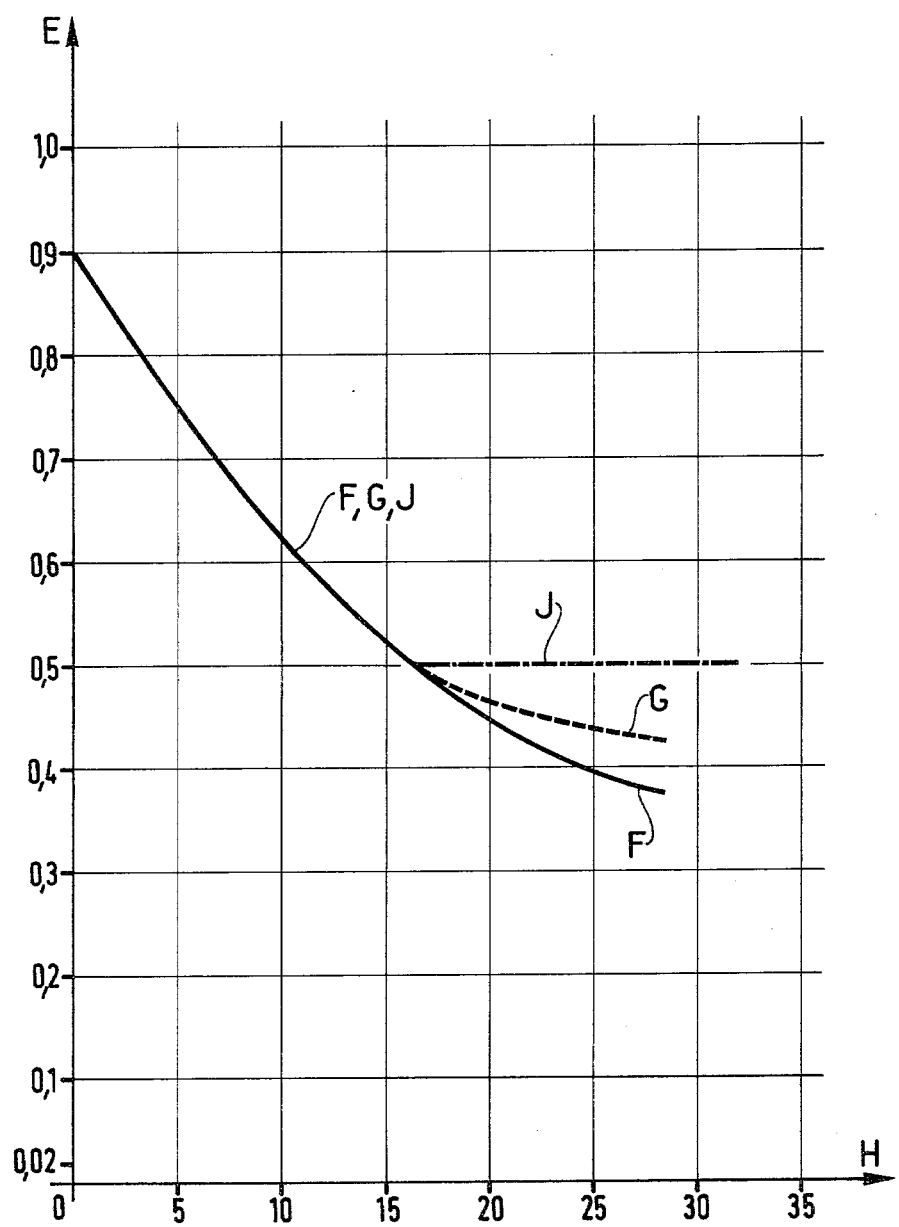

METHOD OF MANUFACTURING A FLEXIBLE ELECTRIC CABLE WHICH HAS A TINNED STRANDED CONDUCTOR ON WHICH AN INSULATION IS APPLIED AT A HIGH TEMPERATURE

FIELD OF THE INVENTION

The present invention relates to a method of manufacturing a flexible electric cable which has a tinned stranded conductor on which an insulation is applied at a high temperature.

BACKGROUND OF THE INVENTION

For electric cables to form reliable links, such as are required for the aeronautical industry, they must be of top quality. The three most important qualities include: flexibility of the conductor, so as to avoid the danger of breakage This quality is obtained by using a stranded conductor constituted by individual copper strands each with a diameter of a few tenths of a millimeter. The second is electrical and mechanical behaviour of the insulation which is necessary to prevent short circuits and is provided by efficient insulating materials. The third is reliability of the connections formed at the ends of these cables by soldering or crimping. Such reliability is obtained by metal coatings which are deposited on the strands to prevent surface oxidation of the copper and to facilitate electric contact.

Polyimides such as, for example, those sold by the American firm Dupont de Nemours in the form of tape under the trade marks Kapton H and Kapton F appear as particularly advantageous insulating materials. In the case of Kapton F, a thermoplastic coating is provided to allow the tape to be sealed. The field of application of cables with varnished or non-varnished Kapton polyimide insulation is growing rapidly and great changes are being made therein due to their general efficiency which remains unrivalled to-day.

One of the features which is most detrimental to the development of such cables is their cost which is a function of the price of the raw materials and of the technique used in manufacturing these cables.

As far as concerns raw materials, the only true variable which appreciably influences the price of cables is the conductor nature. But it was well-known that only copper conductors with a metal coating which withstands high temperatures, e.g. silver or nickel, can be used with Kapton F polyimides.

Silver meets all technical requirements but its cost is very high.

Although nickel is not so expensive, its cost is still high and the main feature which makes it unsuitable for many users is that it is not solderable.

The need to use these expensive metal coatings was already apparent to manufacturers and users a long time ago for the technical reasons set forth hereinbelow.

Taking a known cable which includes a conductor with individual strands a Kapton polyimide taped insulation and an outer mechanically protective varnish, as far as concerns the main applications of these cables and in particular aeronautics, the cable insulation must be perfectly sealed and homogenous. Now, since polyimides are not thermoplastic materials, they cannot be applied by the extrusion technique which is the most used in conventional cable manufacture. Only a taping process can be used providing the different layers of tape are perfectly sealed together.

To be able to fulfill the above condition, it is necessary to choose tapes which are not fully polyimide but which are coated on one or both sides with a thin layer of a thermoplastic material which withstands high temperatures and will soften during heat treatment. This is the case with Kapton F polymide tape whose thermoplastic layer is fluoroethylenepropylene, or FEP, with a softening temperature of 275° to 280° C.

To make the outer surfaces of the cables smoother and to "level out" the edges or extra thickness related to taping techniques, it is current practice to coat such polyimide insulations with a varnish which withstands high temperatures, each successive layer of varnish deposited having to be cured. The varnishing temperature must generally be higher than 250° C.

From the description of these manufacturing processes, it can be understood why conductors with silver or nickel coatings appear to be the only ones compatible with these processes, although the price of bare copper and of tinned copper is much more attractive.

Indeed, bare copper oxidizes during all these heat treatments and in use its surface condition becomes very suitable for any type of connection, either by soldering or by crimping, while tinned copper has a metal coating whose melting point (232° C.) is appreciably lower than the 275° C. required to seal the Kapton F polyimide tapes together and in such conditions it is, in principle, impossible to seal these tapes without making the conductors strands blocked together. Now this cannot be admitted since it is equivalent to using a conductor which has a single strand instead of a conductor with individual strands. The disadvantage of this is that a solid conductor cannot withstand the mechanical stresses which are generated in particular in an aircraft where resistance to vibrations and to bending stresses are vital requirements for cables. Only stranded conductors will meet all these requirements. The technical difficulty in manufacturing such cables is how to conciliate two requirements of supply contracts for these cables, which are:

clause 1: the tinned copper strands must not block together during the various cable manufacturing operations, so as to maintain conductor flexibility.

clause 2: the tinned copper must keep its essential intrinsic characteristics, namely:

resistance to corrosion in service, and easy connection by any soldering or crimping techniques.

To meet the requirements of both these clauses simultaneously, a known process is used at present. However, the present process is far from being sufficiently reliable for the field application. It consists in starting with a sufficient coating thickness of pure tin on the strands so as to have some left at the end of the manufacturing process, this pure tin coating being 0.7 to 1.5 microns thick.

The highest tin/copper diffusion occurs when the Kapton F polyimide tape is sealed. At this first heat treatment, (275° to 280° C.) the thickness of the pure tin layer is reduced by about half. Therefore, it might be considered to only partially seal the tapes i.e. only the outer tape would be completely sealed while the inner tape would be partly sealed The above process theoretically has the following advantages:

due to the thermal inertia of the insulants, there is is insufficient time to heat the conductor to a temperature exceeding. 232° C.; and the lack or imperfection of the inner tape layer sealing eliminates the pressure of the insulant on the conductor and reduces the danger of the strands being blocked together.

Although the above technique may theoretically be used, it entails the following latent and unavoidable drawbacks and dangers:

the sealing quality of the inner layers of polyimide tape is poor and cannot easily be completed during the subsequent manufacturing operations (varnishing) which are normally carried out at lower temperatures than the tape sealing operation; and partial and not easily controllable strand blocking occurs.

Indeed, the duration and the temperature of the heat treatment must be adjusted within a very narrow operation margin and without ever being able to check that the individual strands are not being blocked together in any point along the entire length of the cable. Such a process is therefore insufficient to provide cables with the required degree of reliability.

When the above known process is rejected, the above clauses 1 and 2 remain difficult to reconcile since to meet the requirement of clause 2, the tinned copper conductor strands in the finished cable-after all the heat manufacturing treatments must show a superficial layer of pure (i.e. unalloyed) tin. Now, any heat treatment tends to cause tin to diffuse in copper, the diffusion speed depending on the temperature and the duration of the heat treatment as well as on the previous heating operations to which the tin plated copper has been subjected. Starting from the core of the wires, the metallic layers formed by such a diffusion are constituted by:

| Cu | Pure copper | Both these layers are easily oxidable |
|---|---|---|
| $Cu_3Sn$ | An alloy rich in copper | |
| $Cu_6Sn_5$ | A relatively protective alloy | |
| Sn | Protective pure tin | |

It should be observed that, as soon as the tinned copper wires are manufactured, a thin inter-metallic layer of tin-copper alloys, of about 0.1 micron thick, is formed.

Thermal diffusion tends to reduce the thickness of the pure tin layer possibly until it disappears completely, giving place to a $Cu_6Sn_5$ alloy which also—in extreme cases—may disappear, leaving only the following configuration:

Cu
$Cu_3Sn$

Such a result is disastrous since $Cu_3Sn$ is easily oxidised, is not ductile and leads to textures which become fragile and brittle. Therefore, to obviate this defect, it is necessary to manufacture these cables with tinned copper strands having a minimum thickness of pure tin which is however sufficiently thick for a superficial layer of pure tin to remain on the finished cable.

In such conditions, it does not appear possible to also satisfy clause 1 except by using the previously described known process, since when the insulation tape is applied, a radial pressure is put on the conductor which is brought under pressure to a higher temperature than the melting point of tin when the layers of tape are sealed and when varnish is applied.

The present invention aims to provide a method of manufacturing a flexible electric cable with a tinned stranded conductor and insulation applied at a high temperature by which method well insulated flexible cables, which lead to easy and reliable connections, can be produced simply and safely.

SUMMARY OF THE INVENTION

It provides a method of manufacturing a flexible electric cable with a tinned stranded conductor on which insulation is applied at a high temperature, the method including the following steps:

preparation of a flexible conductor constituted by several tinned copper strands which will not block; and insulation of the conductor with an insulating sheath applied at a temperature at which there is a danger of melting the tin and for blocking the tin-plated strands together while causing partial diffusion of tin in copper.

The method is characterized in that between and/or before said steps during which a flexible conductor is manufactured and said conductor is insulated, it also includes a stage during which a diffusion barrier is formed, through heating the individual strands or the stranded conductor at a temperature and for a period which ensure previous diffusion of tin in copper in a quantity which is sufficient to cause subsequent diffusion of tin in copper during the insulation stage to take place more slowly, so that some pure tin will remain at the end of the insulation stage, although the layer of pure tin on the strands at the beginning of the insulation stage is sufficiently thin to prevent blocking of the strands together.

Preferably, the diffusion barrier is formed at a temperature lying between 100° and 300° C.

Preferably, the thickness of pure tin at the end of said forming stage lies between $\frac{1}{3}$ and $\frac{3}{4}$ of the thickness of the pure tin coating before said forming stage, i.e. between 0.6 and 1.2 microns.

Said insulation stage itself preferably includes the following steps:

wraping several layers of tape under mechanical tension around the conductor;

forming said insulating sheath which results in jointing the layers of tape together by heating to a temperature which is said temperature at which the insulating sheath is formed;

said insulating sheath being formed also by coating with a varnish dried and cured at high temperature.

The aim of heating may be to seal the layers of tape together and/or to polymerize the varnish deposited on these layers.

In the conditions of the method described, the tape is preferably constituted by a thin polyimide sheet, but may of course be constituted by other materials which have comparable electric and mechanical characteristics.

The present invention is based mainly on the fact that the inventors found that it is possible to satisfy clause 1 hereinabove (no blocking of the strands together) provided the layer of pure tin on the tinned strands does not exceed a given thickness which, depending on the diameter of the tinned copper wires used, lies between 0.40 and 0.80 microns.

Indeed, it proves to be true that due perhaps to a surface tension phenomenon, a stranded tinned copper cable conductor can be heated to a temperature appreciably higher than the melting point of tin without causing the individual strands to be blocked together, in the following particular conditions:

if the conductor strands are not compressed, i.e. do not undergo pressure from their insulation, at a temperature exceeding the melting point of tin (232° C.); or if the thickness of the pure tin coating does not exceed 0.4 to 0.8 microns as stated above.

More precisely, the maximum thickness of pure tin, which allows blocking of the strands to be avoided at the manufacturing temperatures (275° C. and slightly above), depends on the diameter of the strands and on the pressure applied thereon by the insulation taping—a pressure which is related to the wraping tension. The wraping tension must be sufficient to prevent voids from remaining between the layers of tape. It must lie between about 1000 and 3000 grams for a tape 7 mm wide and 0.03 to 0.06 mm thick in 2 to 4 layers wrapped on a 1 mm conductor diameter. In the practical pressure conditions so determined, the maximum thickness of the tin coating depends on the diameter of the strands as shown in the table hereinbelow:

| Diameter in mm of the conductors strands | Maximum thickness in microns of pure tin |
| --- | --- |
| 0.127 | 0.40 |
| 0.160 | 0.50 |
| 0.200 | 0.55 |
| 0.250 | 0.60 |
| 0.287 and more | 0.80 |

In practice, to make the cable sufficiently flexible, it is usually required to use strands with a diameter of less than 500 microns.

Now, in conditions known in the prior art, an original pure tin coating thickness of less than 0.6 microns cannot maintain to tinned copper wires a layer of pure tin right up to the end of the various heat treatments applied during manufacture of these cables insulated with varnished Kapton.

In accordance with the present invention, tinned copper, on which the coating thickness of pure tin does not exceed the figures set forth in the table hereinabove can be used for stranded conductors, ensuring no strand blocking while maintaining a sufficient layer of pure tin to impart to the finished cable the indispensable characteristics of solderability and resistance to corrosion.

With reference to the schematic figures of the attached drawings, a non-limiting description is given hereinbelow of how the invention can be put into effect. It must be understood that without going beyond the scope of the invention, the components described and illustrated can be replaced by other components which perform the same technical functions. When the same component is illustrated in several figures, it is designated therein by the same reference symbol.

BRIEF DESCRIPTION OF THE DRAWINGS

FIG. 1 is a perspective view which illustrates a flexible cable manufactured by known methods and by the method in accordance with the invention.

In FIG. 2 is a graph which shows, as a function of the duration H in hours of a heat treatment at 150° C., the variations in microns of the thickness E of the layer of pure tin at the surface of tinned copper strands having a diameter of 0.2 mm. Solid-line curves A and B correspond to strands which have not been previously heat treated and dotted-line curve D corresponds to strands which have previously been heat treated for 16 hours at 135° C. and whose initial thickness was 0.9 microns.

In FIG. 3 is a graph which shows variations in thickness analogous to those in FIG. 2. The solid-line curve F corresponds to a continuous heat treatment at 135° C.; the dotted-line curve G corresponds to a heat treatment at 135° C. stopped after 16 hours for complete cooling and subsequently resumed at the same temperature; and the chain-dotted line J corresponds to a heat treatment stopped after 16 hours for complete cooling and subsequently resumed at 130° C.

DESCRIPTION OF PREFERRED EMBODIMENTS

FIG. 1 illustrates a cable whose conductor 1 is formed by nineteen strands each constituted by a tinned copper wire 0.2 in diameter and is slightly radially compressed by a taping 2 in two to six layers of "Kapton F" polyimide through a single tape or two tapes. The single or inner tape, as shown, having a thermoplastic coating at least on its outer surface, any outer tape being coated on both its surfaces.

Taping is performed in the above-mentioned conditions and is subjected to curing, which seals the tapes, at a temperature exceeding 275° C. for a period of 15 seconds to 3 minutes. The whole is coated with a varnish 3 constituted by 2 to 10 layers applied by immersion, the cable undergoing drying/curing or polymerization at a temperature of at least 250° C. for a period of 15 seconds to 3 minutes at each varnish coating layer. The varnish can be a white coloured modified polyimide.

To constitute such a cable by the method in accordance with the invention, commercial tinned copper wires are used. The wires can be tinned by electrolysis or by hot-diping, but they must undergo previous heat treatment so that a "diffusion barrier" is formed before any manufacturing operation.

The "diffusion barrier" very significantly slows down the subsequent diffusion of tin into copper. It is therefore possible to start with a thickness of pure tin, considered as a safety margin to prevent the strands from blocking together, while some pure tin will remain after cable manufacturing.

The principle of the invention will be better understood on examining the diffusion curves in FIGS. 2 and 3. These curves demonstrate the following laws of diffusion:

1: whatever tinned copper wire is used, i.e. whatever the original thickness of pure tin may be and no matter what heat treatment the wire has previously undergone, it is observed that for a given temperature, diffusion is at first rapid and then slows down. This corresponds to the different slopes of the diffusion curves and demonstrates perfectly the diffusion delaying or "barrier" function performed by tin/copper alloys.

2: the efficiency of the "diffusion barrier" depends on:
the temperature at which it is formed; the higher the temperature, the greater the efficiency; and
the thickness of the layer of alloy.

3: any "diffusion barrier" formed at a given temperature prevents subsequent diffusion at a lower temperature. Safety for users of such cables is thereby greatly improved: in use there is no danger of evolution or of disappearance of the layer of pure tin whatever thin it may be (a few hundredths of a micron), providing there is some left since the diffusion barrier has been formed at a higher temperature than the cable operating temperature.

These tinned copper wires react in a way which is completely different from conventional tinned copper wires in which, moreover, the original pure tin content is much lower (less than 0.3 microns for current tin plating). When the method of the present invention is not applied so as to provide a finished cable with a superficial layer of pure tin, it is indispensable to use wires whose pure tin coating originally has a thickness such that without previous heat treatment, the strands of the conductor will not fail to block together when the Kapton F polyimide tapes are completely heat sealed.

In the case of 0.20 mm wires (FIG. 2) it may be considered that complete production heat treatments are fairly well simulated by a 24 hour heating at 150° C. Now, it is observed that:

When the invention is not used, for an original thickness of pure tin of:

0.9 microns, pure tin remains finaly 0.5 microns, no pure tin remains finaly

For an original thickness of pure tin of 0.9 microns which cannot be used as it is, since it causes the strands to block together during the cable manufacture, but if, before use, its thickness is reduced from 0.9 microns to 0.5 microns by previous heating at 135° C. during a period of 16 hours in accordance with the invention, it becomes possible to meet with full security and all desired reliability the requirements of:

no blocking of the conductor strands during cable manufacture; and maintaining on the finished cable a superficial layer of pure tin which is not liable to be modified or to disappear during the service life of the cable.

Examples are given hereinbelow of the thickness of pure tin, measured at the various production stages in accordance with the invention, on a 20 AWG, 19 strands aircraft cable (cross-ection: 0.6 mm$^2$) in which the diameter of each strand is 0.20 mm:

| Production stage | Thickness of pure tin (in microns) | |
|---|---|---|
| | Minimum values | Maximum values |
| Upon reception of tinned copper wire | 0.8 | 1.0 |
| After previous heat treatment (16 hours at 135° C.) | 0.42 | 0.50 |
| After taping and curing | 0.24 | 0.40 |
| After varnishing and curing | 0.05 | 0.12 |

It has been found that, whatever the diameter of the conductors may be, the previous heat treatment must reduce the thickness of pure tin to between ⅓ and ¾ of the original thickness.

The previous heat treatment in accordance with the invention can evidently be applied using various techniques, the best known of which consist in using one of the following methods of treatment for the individual strands or for the stranded conductor:

an oven in which the treatment at about 100° to 150° C. lasts for several hours:

a furnace at a higher temperature (150° to 300° C.) and through which the wire passes, but for a shorter period (5 seconds to 10 minutes); or heating by Joule effect, such as used for annealing drawn wires.

The above list is non-restrictive.

From the above, it is apparent that before the present invention, the use of tinned copper stranded conductors appeared incompatible or unreliable in the case of the technics for manufacturing polyimide insulations.

The invention makes such manufacture easy and the product is as reliable as required, while maintaining the main intrinsic characteristics of the tin-plated copper conductor (namely: flexibility, solderability and resistance to corrosion). More particularly, the following advantages are obtained:

1: Copper is electrochemically protected by tin;

2: Said protection is not lessened in normal conditions of use of the cables (operating temperature not exceeding 150° C.);

3: Ease of connection of the tinned copper conductors by any soldering or crimping procedure is preserved; and 4: Flexibility and resistance to alternate bending stresses, which are inherent to stranded conductor cables, remain excellent.

We claim:

1. A method of manufacturing a flexible electric cable with a tinned stranded conductor on which insulation is applied at a high temperature, said method including the following steps:

preparing a flexible conductor (1) constituted by several tinned copper strands which will not block; and applying a conductor insulation sheath (2, 3) at a temperature at which there is a danger of melting the tin and of blocking the tin-plated strands together while causing partial diffusion of tin in copper; the improvement comprising:

between and/or before said steps during which a flexible conductor (1) is formed and said conductor is insulated, forming a diffusion barrier, including heating of the individual strands or stranded conductor at a temperature and for a period which ensure previous diffusion of tin in copper in a quantity which is sufficient to cause subsequent diffusion of tin in copper during the insulation step to take place more slowly, so that there remains some pure tin at the end of the insulation step, although the layer of pure tin on the strands at the beginning of the insulation step is sufficiently thin to prevent blocking of the strands to occur.

2. A method according to claim 1, wherein during diffusion barrier formation, said barrier is formed at a temperature lying between 100° and 300° C.

3. A method according to claim 2, wherein said step of forming a diffusion barrier is carried out at a temperature and during a period which are sufficient for the thickness of pure tin at the end of said step to lie between ⅓ and ¾ of the thickness of pure tin before said step.

4. A method according to claim 3, wherein the thickness of pure tin after said step during which a diffusion barrier is formed, lies between 0.4 and 0.8 microns.

5. A method according to claim 4, wherein the thickness of pure tin before said step during which a diffusion barrier is formed lies between 0.6 and 1.2 microns.

6. A method according to claim 1, wherein said insulation step itself includes the following sub-steps:

wrapping several layers of tape under mechanical tension around the conductor;

forming said insulating sheath which results from jointing the layers of tape together by heating to a temperature which is said temperature at which the insulating sheath is formed;

forming said insulating sheath also by coating with a varnish dried and cured at a high temperature.

7. A method according to claim 6, wherein said tape is made of polymide.

* * * * *